April 9, 1968
A. CLARK
3,376,644
LOCKING HANDLE STRUCTURE FOR A COMBINATION
DENTAL MIRROR AND RETRACTOR
Filed May 20, 1965
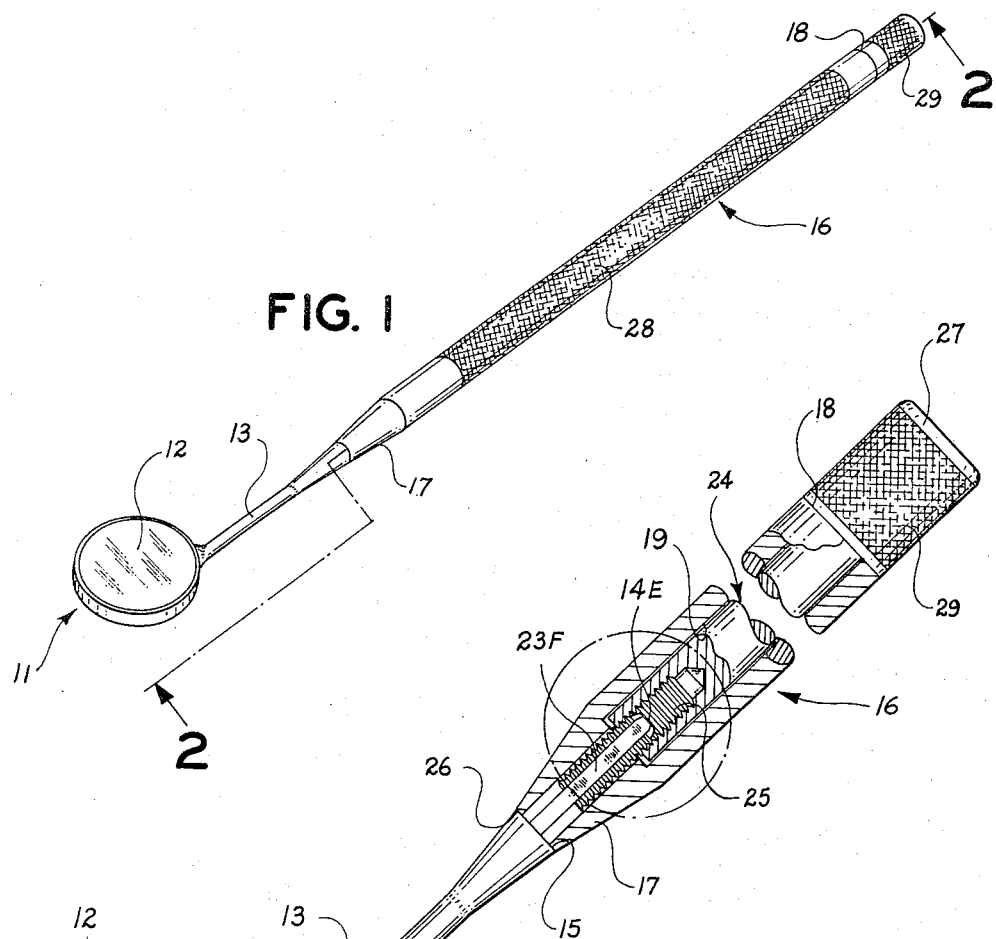
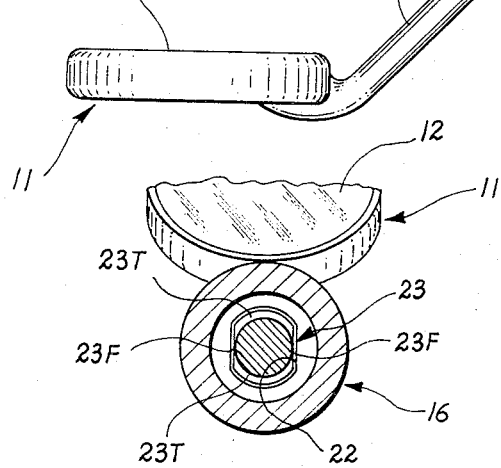
INVENTOR.
ALEXANDER CLARK United States Patent Office 3,376,644
Patented Apr. 9, 1968

3,376,644
LOCKING HANDLE STRUCTURE FOR A COMBINATION DENTAL MIRROR AND RETRACTOR
Alexander Clark, 1801 Asheville Highway, Hendersonville, N.C. 28739
Filed May 20, 1965, Ser. No. 457,341
2 Claims. (Cl. 32—69)

ABSTRACT OF THE DISCLOSURE

A locking handle structure for a combination dental mirror and retractor wherein the dental mirror and retractor are carried on an angulated rod and shank extending therefrom and a longitudinal handle member which are effectively non-rotatively fastened together in a very rigid, structurally strong manner through the use of a non-round effective male keying and spline means carried by said shank and normally mounted within a corresponding non-round female keying and spline means carried by the forward end of the handle member. The arrangement is such that a tension-applying member may tighten the two keying and spline structures just referred to into a rigid and relatively non-rotatable relationship so that the dental mirror may be used in a conventional manner and the head may be used as an oral retractor without any likelihood of it becoming inadvertently disengaged and capable of rotating so as to release retracted tissue during the performance of dental surgery, a tooth-extraction, tooth-filling operation, or the like.

---

Generally speaking, the present invention relates to a type of dental instrument or tool effectively comprising a combination dental mirror and retractor carried by a handle and which is conventionally adapted to be placed within a dental patient's mouth to facilitate viewing various interior portions thereof, when used as a mirror, and to act as a depressor or retractor of tongue and/or cheek tissue, or other adjacent tissue, when used as a retractor to improve the field of view of a dentist or a dental surgeon or the like. Of course, such a combination dental mirror and retractor may perform both functions at once under certain circumstances.

The retractor function of such a combination dental mirror and retractor instrument or tool is quite important when any form of dental repair work involving a power-driven cutting tool or burr is to be performed by a dentist since any inadvertent or accidental releasing of retracted tissue might cause it to come into contact with such a power-driven cutting disc or burr or other tool which may seriously injure said tissue. However, it should be noted that such prior art conventional combination dental mirrors and retractors are conventionally of a structure such as to make such inadvertent release of depressed or retracted tissue quite possible with the consequent damage thereto resulting from inadvertent contact of such released tissue with a power driven cutting disc or burr operated by a dentist. This is a serious disadvantage of such prior art combination dental mirrors and retractors and arises from the nature of the conventional structure thereof which usually comprises a small circular disc-shaped mirror and mirror-mounting frame provided with a threaded shank adapted to be threaded into the end of a longitudinal handle. In other words, there is no positive rotary movement immobilization of such a conventional prior art combination dental mirror and retractor structure, and the threaded engagement of the mirror-carrying shank in the end of the longitudinal handle member may loosen at any time during use and may effectively rotate so that the mirror-mounting frame, which effectively comprises the retractor means thereof, may inadvertently turn with respect to the longitudinal handle member while dental work is being performed and thus may very easily release retracted tissue and cause serious damage thereto by contact with a power driven dental tool being used by the dentist very closely adjacent to the previously retracted and now inadvertently released oral tissue.

The major purpose of the present invention is to provide a complete solution to the above-mentioned prior art problem by the provision of a novel combination dental mirror and retractor having a longitudinal handle and additionally having means for positively non-rotatably interconnecting said combination mirror and retractor with respect to the longitudinal handle so that no such inadvertent rotation thereof and consequent accidental release of oral tissue will occur.

Another point to be noted is that in an attempt to overcome the above-mentioned prior art problem with the above-mentioned conventional prior art type of combination dental mirror and retractor, damage is sometimes done to the mounting of the dental mirror in the mirror-mounting frame by grasping same with a pair of pliers in order to make it possible to tighten the threaded connection of the shank with respect to the longitudinal handle member to a degree such as to avoid inadvertent and accidental unthreading thereof. Such grasping of the mirror-mounting frame with a pair of pliers, or the like, is very likely to break the air seal between the edge and back of the mirror and the mirror-mounting frame which, thus, allows moisture to enter into said region and which then causes the mirror to frost and lose its clear specular characteristics to a substantial degree, which, consequently, partially destroys its usefulness.

The novel apparatus of the present invention requires no such use of pliers and, therefore, prevents any possibility of damage of the above-mentioned prior art type occurring to the mirror and, in particular, to the air seal of edge and back portions thereof with respect to the mirror-mounting frame. In other words, no great amount of torque is required for locking the combination mirror and retractor of the present invention with respect to the longitudinal handle member. This may be done by applying a very small amount of torque with thumb and finger to an operating part at the lower end of the handle which provides positive non-rotative engagement of the shank portion carrying the mirror-mounting frame and mirror with respect to the front end of the longitudinal handle member and yet does so in a manner which can be very easily released when desired, such as for removal or, in certain cases, replacement of the mirror-mounting frame and shank with another unit which, in some cases, may be of a different size or may differ in various other ways for use under slightly different conditions.

With the above points in mind, it is an object of the present invention to provide a novel combination dental mirror and retractor having a longitudinal handle and controllably operable means for positively non-rotatably interconnecting said combination mirror and retractor with respect to said longitudinal handle and doing so in a manner requiring no specialized tools and no great amount of torque for providing such non-rotatable locking interconnection therebetween and also in a manner providing for the easy release and disengagement thereof when desired.

It is a further object of the present invention to provide apparatus of the character referred to herein, having the advantages referred to herein, and including the features referred to herein, generically and/or specifically, and individually or in combination, and which is of extremely simple, inexpensive, easy-to-use construction, adapted for ready mass manufacture at very low cost whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying single drawing sheet and is described in detail hereinafter.

FIG. 1 is an exterior, three-dimensional, pictorial view, illustrating one exemplary embodiment of the present invention in fully assembled relationship with the combination mirror and retractor, comprising the mirror-mounting frame therefor, and the shank extending therefrom all in positively non-rotatably interconnected and locked relationship with respect to the front end of the longitudinal handle member. In other words, this shows the complete assembled apparatus in condition for use.

FIG. 2 is an enlarged, partially broken away view, partly in section and partly in elevation, along the staggered line plane indicated by the arrows 2—2 of FIG. 1. It will be noted that the mirror mounting frame and the mirror are shown in full side elevation in this view and that most of the remainder of the apparatus to the right thereof is shown in section substantially on a vertical central plane along the length of the longitudinal handle member, which has a central portion broken away and removed for drawing space conservation reasons since this view is drawn to a substantially larger scale than FIG. 1. Also, most of the inner longitudinal tension-applying member is shown in full elevation in this view rather than in central plane vertical section in the manner of the showing of the exterior hollow longitudinal handle member.

FIG. 3 is an enlarged, detailed view of that portion of FIG. 2 enclosed within the broken line circle and illustrates the threaded engagement of the threaded outer attachment end of the mirror-mounting frame's shank with respect to the threaded front end of the longitudinal tension-applying member passing longitudinally through the bore of the hollow longitudinal handle member.

FIG. 4 is an enlarged, fragmentary view, taken substantially along the plane indicated by the arrows 4—4 of FIG. 3, and clearly illustrates the non-round female keying or spline means carried at the front end of the longitudinal handle member and the cooperating similar non-round keying or spline means carried by the threaded outer attachment end of the mirror-mounting frame's shank whereby to positively non-rotatively interconnect and lock said elements with respect to each other.

Generally speaking, the exemplary form of the invention illustrated comprises a mirror-mounting disc-shaped frame, such as is generally designated by the reference numeral 11, which is of more or less conventional construction and which carries therein a substantially disc-shaped reflective dental mirror member 12, which is also of a substantially conventional type and which is normally edge and back sealed with respect to the mirror mounting frame 11 in a manner such as to prevent the entry of moisture into the region therebetween, which would have the undesirable effect of causing rapid deterioration of the reflective qualities of the mirror member 12 by reason of condensation and effective interference with respect to the conventional silvering or other backing material on the mirror member 12 which renders it reflective. Since the mirror mounting frame 11 and mirror member 12 are of substantially conventional construction and do not touch upon the real inventive concept of the present invention, they are not shown in detail in the figures of the drawings but are merely shown exteriorly.

The mirror-mounting frame 11 is further provided with an angulated rod and shank 13 extending therefrom and having a threaded outer attachment end, generally designated by the reference numeral 14. Said shank 13 has an abutment shoulder 15 positioned between the threaded outer end 14 and the inner portion of the shank 13 adjacent to the mirror mounting frame 11, the purpose of which will be described hereinafter.

The exemplary form of the invention illustrated also includes a longitudinal handle member, such as is generally designated at 16, which has a front end 17 and a rear end 18 and which has a substantially cylindrical longitudinal bore 19 extending from the open rear end 18 to the front end 17 and at said front end 17 is provided with a reduced diameter, non-round portion 21 defined by, surrounded by, and comprising non-round effective female keying and spline means designated at 22 as best shown in FIG. 4.

It should also be noted that the threaded outer attachment end 14 of the shank 13 is provided with a similar non-round effective male keying and spline means as best shown at 23 in FIG. 4 and of a size and shape such as to be adapted for non-rotative engagement with respect to the corresponding non-round female keying and spline means 22 carried within the forward end 17 of the longitudinal handle member 16 and at the forward end of the longitudinal bore 19 therein. It should be noted that in the specific exemplary arrangement illustrated, the threaded attachment end 14 of the shank 13 may initially be of exteriorly threaded round shape and may then have the side portions thereof ground away or otherwise rendered substantially flat as indicated at 23F which will partially remove the threads at the side thereof but which will leave threads at the top and bottom portions 23T thereof. The non-round effective female keying and spline means 22 may merely comprise a non-round hole shaped in a manner substantially similar to the shape of the non-round threaded shank portion 14 which has had the side portions flattened as indicated at 23F. It should also be noted that said non-round hole comprising said female keying and spline means 22 is normally not interiorly threaded and is slightly larger than the threaded outer attachment end portion 14 of the shank 13 so that they may be slidably moved into the engaged relationship shown in FIGS. 2, 3, and 4 without any threaded interaction or interengagement thereof insofar as said portions 22 and 23 are concerned.

The exemplary form of the invention illustrated also includes a longitudinal tension-applying member, such as is generally designated at 24, which is of a size such as to be adapted to be normally positioned within the longitudinal bore 19 in the longitudinal handle member 16 with an interiorly threaded female socket portion 25 at the front end thereof being adapted to threadedly engage the extreme end portion 14E of the threaded outer attachment end 14 whereby to forcibly apply tension thereto in a manner such as to firmly draw said threaded outer attachment portion 14 of the shank member 13 into the firmly engaged relationship clearly shown in FIGS. 2 and 3 with the previously mentioned abutment shoulder 15 being in firm forcible abutting contact with a rotary contact shoulder 26 formed by the front or terminal end of the conical front end portion 17 of the longitudinal handle member 16. This locking, tension-applying action is made possible by reason of the enlarged operating portion 27 carried at the rear end of the longitudinal tension-applying member 24, which is positioned adjacent to the open rear end 18 of the longitudinal handle member 16 and which is normally in abutment therewith as is clearly shown in FIG. 2.

It will be noted that the exterior of the longitudinal handle member 16 is provided with frictional knurled surface means 28 and that the exterior of the operating portion 27 is similarly provided with frictional knurled surface means 29 for facilitating manual relative rotation thereof for locking and unlocking the mirror-mounting frame 11, shank 13, and threaded outer attachment end 14 with respect to the front end 17 of the longitudinal handle member 16 as desired. However, the exterior of the longitudinal handle member 16 and/or the operating portion 27 may be modified from the arrangement illustrated and, if desired, may be provided with various other types of effective frictional surface means, or the like.

In the exemplary form illustrated, the previously mentioned male non-round keying and spline means 23 comprises a portion of the threaded outer attachment end 14 having the opposed substantially flat surface parts 23F interconnected by substantially arcuate and threaded surface parts 23T, and said effective female keying and spline means 22 comprises a similarly shaped interior hole-defining portion at the forward end of the longitudinal handle member 16 and at the forward end of said longitudinal interior bore 19 therein, but it should be clearly noted that the type of non-round keying and spline means, both with respect to the female and male portions thereof as designated at 22 and 23, may be modified substantially within the broad spirit and scope of the present invention, and, indeed, various other effective keying and spline means which will prevent relative rotation may be employed in lieu of the specific structural arrangement illustrated in the figures of the drawings.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A locking handle structure for a combination dental mirror and retractor, comprising: a mirror-mounting frame and effective retractor head element carrying therein a reflective dental mirror member and further being provided with an angulated rod and shank extending therefrom and having a threaded outer attachment end and an abutment shoulder positioned between said threaded outer end and said mirror-mounting frame; a longitudinal handle member having a front end and a rear end and having a longitudinal bore extending from said rear end to said front end and provided at said front end with a reduced diameter, non-round portion defined by and surrounded by non-round effective female keying and spline means, said threaded outer attachment end of said rod and shank being provided with a similar non-round effective male keying and spline means of a size and shape such as to be adapted for non-rotative engagement with respect to said corresponding non-round female keying and spline means carried by said longitudinal handle member at the front end of said longitudinal bore therein; a longitudinal tension-applying member normally removably positioned within said longitudinal bore in said longitudinal handle member and having a threaded portion at the front end thereof threadedly cooperable with respect to the threaded outer attachment end of said rod and shank for forcibly applying tension thereto in response to rotation of said longitudinal tension applying member with respect to said threaded outer attachment end of said rod and shank, said longitudinal tension applying member having an enlarged operating portion at the rear end thereof positioned exteriorly of, adjacent to, and normally in abutment with respect to said rear end of said longitudinal handle member for relative rotation with respect thereto, said forward end of said longitudinal handle member being provided with a rotary contact shoulder positioned for forced abutment with said abutment shoulder carried by said rod and shank; said non-round effective male keying and spline means comprising a portion of said threaded outer attachment end extending along the threaded lengths thereof and having opposed substantially flat and parallel surface parts interconnected by a pair of opposed, oppositely arcuately curved threaded surface parts, said non-round effective female keying and spline means comprising a similar double-flatted, circle-shaped hole-defining portion of the front end of said longitudinal handle member at the front end of said longitudinal interior bore therein, said longitudinal handle member and said separate and relatively rotatable operating portion being exteriorly provided with frictional surface means for facilitating manual relative rotation thereof for locking and unlocking said mirror-mounting frame with respect to said front end of said longitudinal handle member while maintaining said frame in nonrotatable relationship with respect to said front end of said longitudinal handle member.

2. A locking handle structure for a combination dental mirror and retractor, comprising: a mirror-mounting frame and effective retractor head element carrying therein a reflective dental mirror member and further being provided with an angulated rod and shank extending therefrom and having an exteriorly threaded outer attachment end and an abutment shoulder positioned between said threaded outer end and said mirror-mounting frame; a longitudinal handle member having a front end and a rear end and having a longitudinal bore extending from said rear end to said front end and provided at said front end with a reduced diameter, non-round portion defined by and surrounded by non-round effective female keying and spline means, said threaded outer attachment end of said rod and shank being provided with a similar non-round effective male keying and spline means of a size and shape such as to be adapted for non-rotative engagement with respect to said corresponding non-round female keying and spline means carried by said longitudinal handle member at the front end of said longitudinal bore therein; a longitudinal tension-applying member normally removably positioned within said longitudinal bore in said longitudinal handle member and having an interiorly threaded female socket portion at the front end thereof threadedly cooperable with respect to the exteriorly threaded outer attachment end of said rod and shank for forcibly applying tension thereto in response to rotation of said longitudinal tension applying member with respect to said threaded outer attachment end of said rod and shank, said longitudinal tension applying member having an enlarged operating portion at the rear end thereof positioned exteriorly of, adjacent to, and normally in abutment with respect to said rear end of said longitudinal handle member for relative rotation with respect thereto, said forward end of said longitudinal handle member being provided with a rotary contact shoulder positioned for forced abutment with said abutment shoulder carried by said rod and shank; said non-round effective male keying and spline means comprising a portion of said exteriorly threaded outer attachment end extending along substantially the complete threaded length thereof and having opposed, substantially flat parallel surface parts interconnected by opposite, outwardly convex, exteriorly threaded surface parts whereby to define a double-flatted-circular cross-sectional male configuration and structure thereof, said non-round, effective female keying and spline means comprising a similarly-shaped, interior, hole-defining non-threaded portion of the front end of said longitudinal handle member at the front end of said longitudinal bore therein whereby to define a double-flatted-circular cross-sectional female configuration and structure thereof of a shape similar to but slightly larger than the corresponding double-flatted-circular male configuration and structure of the male keying and spline means and the exteriorly threaded outer attachment end portion longitudinally coincident therewith, said longitudinal handle member and said separate and relatively rotatable operating portion being exteriorly provided with frictional knurled surface means for facilitating manual relative rotation thereof for locking and unlocking said mirror-mounting frame with respect to said front end of said longitudinal handle member while firmly maintaining said mirror-mounting frame in non-rotatable relationship with respect to said front end of said longitudinal handle member throughout said locking and unlocking thereof.

References Cited

UNITED STATES PATENTS

| 812,567 | 2/1906 | Ivory | 32—40 X |
| 815,153 | 3/1906 | Fritz | 32—50 X |
| 3,300,859 | 1/1967 | Sanden | 32—69 |

RICHARD A. GAUDET, *Primary Examiner.*

R. L. FRINKS, *Assistant Examiner.*